United States Patent [19]
Ashton

[11] Patent Number: 6,136,362
[45] Date of Patent: Oct. 24, 2000

[54] HIGH TEMPERATURE/SHORT TIME PASTEURIZATION SYSTEM AND METHOD OF CLEANING

[75] Inventor: Roger J. Ashton, Kenosha, Wis.

[73] Assignee: Alfa Laval Flow Inc., Pleasant Prairie, Wis.

[21] Appl. No.: 09/208,787

[22] Filed: Dec. 10, 1998

[51] Int. Cl.[7] .................................................. A23L 3/16
[52] U.S. Cl. .................. 426/521; 134/169 R; 99/453; 137/240
[58] Field of Search .................................. 426/426, 521, 426/522; 134/169 R, 169 C, 166 R, 166 C; 99/453; 137/240, 563, 625.4, 869, 597

[56] References Cited

U.S. PATENT DOCUMENTS

| | | | |
|---|---|---|---|
| 4,254,792 | 3/1981 | Schadel | 137/240 |
| 4,304,251 | 12/1981 | Schadel et al. | 137/240 |
| 4,368,753 | 1/1983 | Brakelmann et al. | 137/240 |
| 4,373,545 | 2/1983 | Knappe | 137/240 |
| 4,460,014 | 7/1984 | Mases et al. | 137/614.18 |
| 4,479,423 | 10/1984 | Schwitters et al. | 99/455 |
| 4,483,360 | 11/1984 | Knappe et al. | 137/240 |
| 5,226,449 | 7/1993 | Zimmerly | 137/597 |
| 5,232,023 | 8/1993 | Zimmerly | 137/637.2 |
| 5,390,694 | 2/1995 | Zimmerly et al. | 137/240 |
| 5,469,880 | 11/1995 | Zimmerly | 137/240 |
| 5,503,064 | 4/1996 | Scheel et al. | 99/453 |
| 5,564,457 | 10/1996 | Beck | 137/15 |

*Primary Examiner*—Milton Cano
*Assistant Examiner*—Sherry A. Daverman
*Attorney, Agent, or Firm*—Hovey,Williams, Timmons & Collins

[57] ABSTRACT

A system for continuous pasteurizing of liquid foods is provided which includes the ability to clean the pasteurizing system in place without the need for manual connection and disconnection of piping. The system includes a supply of liquid food product, a source of water, a heat exchanger section for heating the liquid food product, a balance tank for maintaining desired flow to the heat exchanger during fluctuations in demand, and at least one mixproof valve connected to the water source and liquid food supply for delivering one or the other, without risk of intermixing, upstream of the balance tank. The system also discloses the use of a mixproof valve for delivering clean in place solution to the balance tank while preventing the flow of liquid food into the clean in place solution source. A further mixproof valve may be provided downstream from the heat exchanger to permit use of clean in place liquid through the system without entering the pasteurized product delivery line, unless it is desired to do so. The system permits clean in place to take place throughout the system through employment of a clean in place vacuum breaker valve so that virtually the entire system may be cleaned without the need to disconnect and reconnect pipes and fittings.

23 Claims, 5 Drawing Sheets

HIGH TEMPERATURE/SHORT TIME PASTEURIZATION SYSTEM AND METHOD OF CLEANING

BACKGROUND OF THE INVENTION

1. Field of the Invention

This invention relates to a continuous closed-loop system for pasteurizing liquid foods such as milk which maintains separation of the liquids during clean in place cycles for sanitizing the system and inhibits undesired mixing of the liquid food and cleaning and flushing liquids.

2. Description of the Prior Art

Pasteurization of liquid foods such as milk, fruit juice or soups requires that the liquid be raised to a sufficiently high temperature for a sufficient length of time so as to render the liquid safe for consumption for a specified period of time known as shelf life. Continuous pasteurization systems for milk must meet prescribed parameters set by governmental authorities for temperature and duration at that temperature. The United States Food and Drug Administration (FDA), for example, has developed the Pasteurized Milk Ordinance (PMO) which requires milk to be raised to a temperature of 162° Fahrenheit (approximately 74° C.) for a minimum of 16 seconds. Milk is no longer considered legal if untreated milk is later mixed with the pasteurized milk, and is unacceptable for sale and consumption if intermixed with cleaning liquids.

Milk pasteurization may be either a batch system or, more commonly, a continuous system. In a continuous system, it is necessary to deliver the milk to a holding tank after pasteurization. In such a system, it is necessary to prevent a buildup of vacuum in the milk pipeline which may inhibit or prevent the delivery of milk under satisfactory pressure. In such systems, it is also necessary to provide the capability of cleaning the internal components of the pasteurization system as skin or film, or burned-on milk may accumulate and afflict the quality of the pasteurized product. Modern production processes particularly favor clean-in-place systems. One valve particularly useful in inhibiting the reversal of the flow of treated or aseptic liquid and in permitting the system to be cleaned in place (CIP) is shown in U.S. Pat. No. 5,564,457.

Figure 1A:
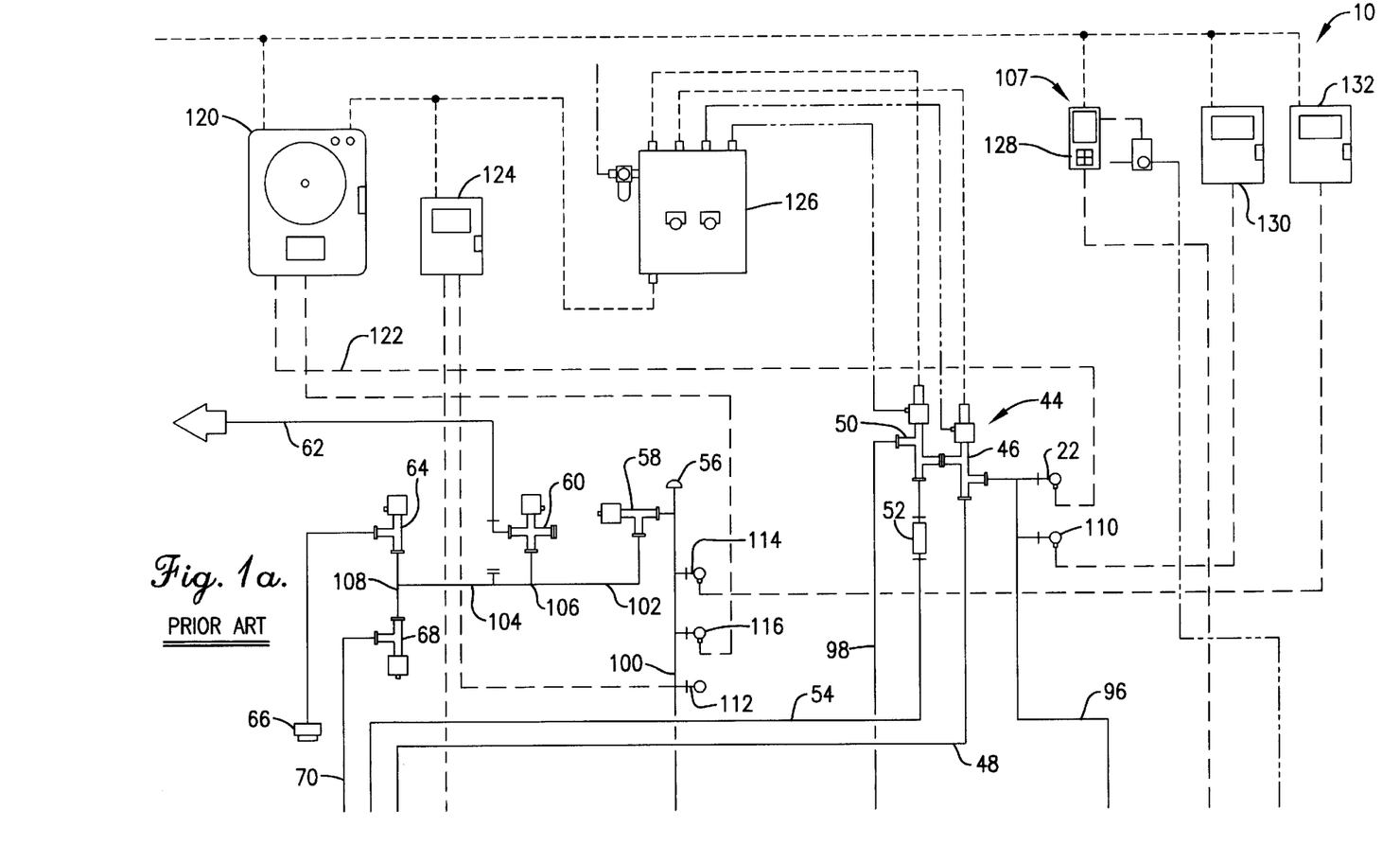
FIGS. 1a and 1b are schematic drawings of a prior art continuous flow high temperature short time pasteurizing system for milk products, FIG. 1a being a portion of the prior art system and FIG. 1b showing the remaining portion, it being understood that FIGS. 1a and 1b are to be read together as a single system.
Figure 1B:
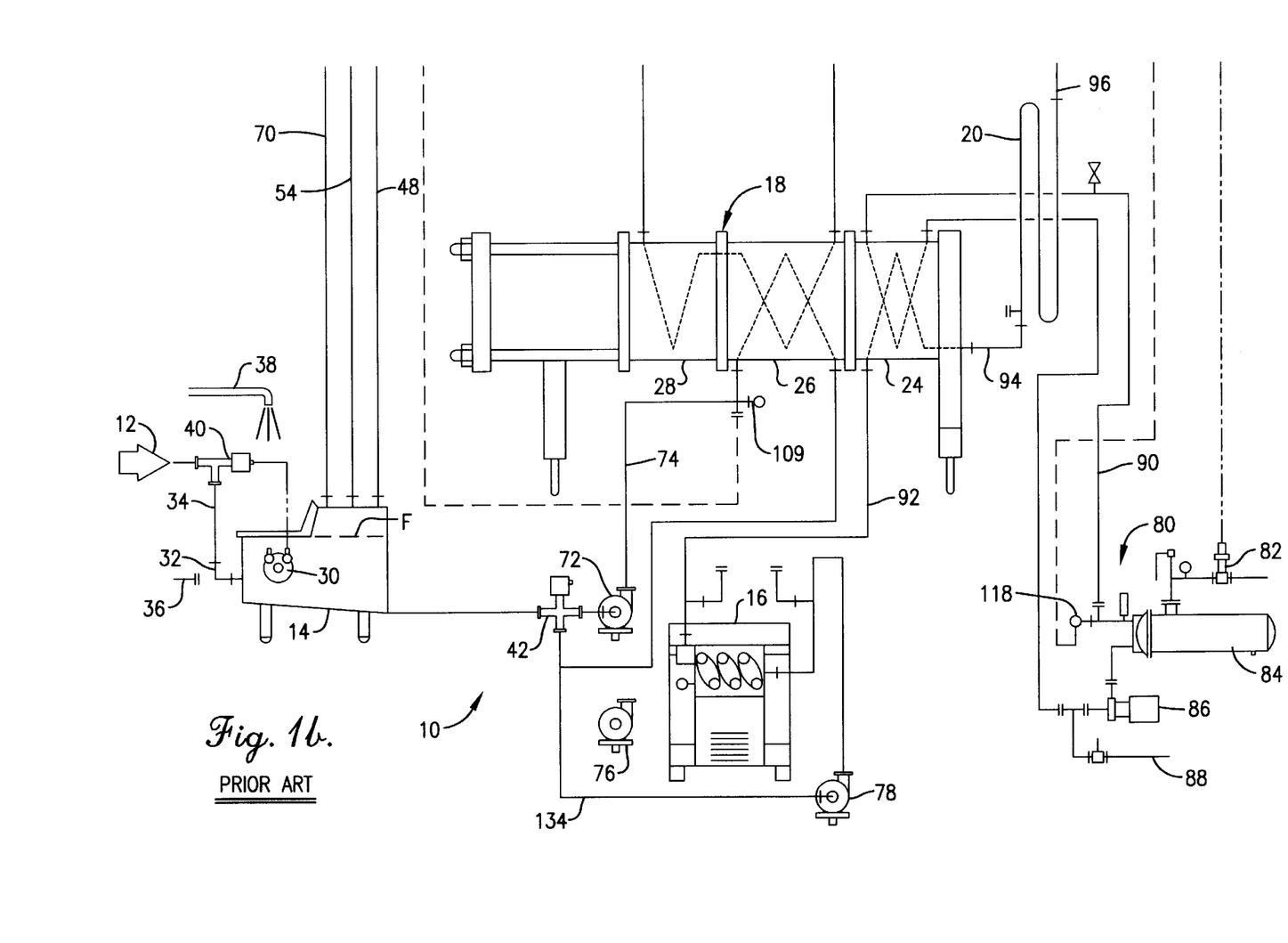

FIGS. 1a and 1b, labeled "Prior Art", show a conventional layout for continuous processing system known in the art. For ease of understanding, the prior art system can be broken down into a raw milk intake section, a homogenizer section, a hot water supply section, a heat exchanger section, a holding section, a flow diversion section, a raw milk section and a control section.

In such a system, raw milk enters a balance tank which preferably provides a volume of milk held at a predetermined level to maintain a constant head for the milk supply. The raw milk is delivered either to a homogenizer, which serves as a timing pump, or once the system has reached and exceeded minimum pasteurizing temperature, through booster pump 1 to the regeneration section of the counterflow heat exchanger to elevate the heat of the entering raw milk by obtaining heat from the already treated milk and return this slightly heated milk to the homogenizer. The raw milk is then heated to the pasteurization temperature by heater of the heat exchanger section, typically from a steam energized hot water supply. After being heated in the heater section of the counterflow heat exchanger, the milk is passed to a holding tube where the milk is retained at an elevated temperature. The milk then passes to a safety thermal limit recorder (STLR) which monitors the heat of the milk leaving the holding tube. If the milk has not maintained sufficient temperature, then it is returned to the balance tank by the flow diversion device (FDD). If the temperature exceeds the minimum at the STLR, the milk is then considered aseptic or pasteurized.

The pasteurized milk then returns to the regeneration section of the heat exchanger for scavenging heat from the treated milk and raising the temperature of the raw milk as described above. After passing through the regeneration section, the pasteurized milk flows through a cooler section of the heat exchanger to lower its temperature, typically to about 35° F. (about 1–20° C.) After chilling, the pasteurized milk passes to a vacuum breaker valve to prevent backflow and past a backpressure valve. If any contaminants or raw milk has contacted the milk, or perhaps during a changeover from skim to 2% to homogenized or chocolate milk, the milk may be discharged to a drain or recycled to the balance tank for reprocessing. If the treatment is complete, then the final pasteurized milk is delivered to a holding tank for packaging and delivery.

In order to clean the system, the milk supply pipe must be physically disconnected and a clean in place liquid supply must be connected. That is to say, during start up when water is used as the system is heated to the desired temperature, a pipe arm swings over to replace the raw milk intake and is manually added to the balance tank before milk is introduced. Then, during the cleaning cycle, the milk pipe is physically disconnected and a different CIP pipe is connected to deliver cleaner (a sanitizer, alkaline or acid liquid cleaning solution) to the system. This same connection and disconnection process must be repeated during water flushes between products, e.g. between skim milk to 2% butterfat milk to homogenized (3.5% butterfat) milk. The need for manual connection and disconnection of separate pipes stems from the requirements of pasteurizing regulations that milk products and cleaning solutions be maintained separated without risk of crossover contamination.

Moreover, the short wash to scrub burn-on from the heater plates requires manual connection and disconnection of the pipes into the system. Each cycle of connection or disconnection risks introduction of debris or other contaminants into the liquid food, as well as consuming substantial time when the system could be productively operating. Typically, a short wash might have to be done 2 or 3 times in a production day, each period of decoupling and recoupling swing bends requiring about one hour of downtime in addition to cleaning time.

A need has thus developed for a liquid food pasteurizing system and method of operation whereby the need for physical disconnection of piping or other components in day to day operation may be eliminated.

There is additionally a need for a liquid food pasteurizing system capable of introducing water directly into the balance tank without reconnection.

There is further a need for a liquid food pasteurizing system which is capable of introducing and removing clean in place cleaners from the balance tank without reconnection.

There is additionally a need for a completely automatic liquid food pasteurization system which meets or exceeds existing governmental regulations without risk of intermixing raw liquid food with treated aseptic liquid food.

There is also a need for an automatic pasteurization system which avoids the need for routine manual intervention and reconnection to inhibit injuries or fully tightened connection.

SUMMARY OF THE INVENTION

These and other objects have largely been met by the automatic high temperature short time liquid food pasteurization system of the present invention. That is to say, the automatic pasteurization system of the present invention permits the operator to selectively introduce clean in place liquid, water for flushing, or raw milk without the need to manually connect or tear down of any component during normal day to day operation. The system includes the additional benefit that all liquids, including water and CIP liquids, which may be acid or alkaline, are introduced below the liquid level in the balance tank, thereby limiting spills or injury due to splashing. Finally, the system includes a clean in place vacuum breaker valve to permit CIP cleaning of the entire system during the short wash cycle, if desired. While described in terms of a milk pasteurization system, it may be appreciated that any readily flowable liquid food which is pasteurized (heated to an aseptic condition) may be treated in the system and method as described.

Broadly speaking, the system of the present invention includes a liquid supply manifold for connection to the balance tank, an improved balance tank having a pair of inlets beneath operating liquid level, heat exchanger and holding tube section, flow diversion section, a discharge manifold section and a controller section. The liquid supply manifold preferably includes at least one and preferably a plurality of double-seat mixproof valves which meet the criteria of the PMO and permit the introduction of raw milk, potable water, and CIP solution to the balance tank. The balance tank is preferably modified to receive separate inlets from the supply manifold and a separate chemical feed manifold so that solutions of cleaners and sanitizers may be provided below the flood plane of the balance tank. This beneficially reduces aeration and foaming in the balance tank and minimizes splashing of acids or caustic cleaning solutions onto an operator. Preferably, two or more cleaning solutions may be provided by the chemical manifold and remotely actuated to provide a selection for the application of different chemicals without the need for disconnection and hookup of different feed lines.

The ability to avoid manual tear-down and reconnection of swing arm piping during short wash cycles is made possible by the use of double-seat mixproof valves which meet the criteria of the PMO in separating milk, potable water and CIP solutions. These double-seat mixproof valves which meet the criteria of the PMO are included in components of the supply manifold, the discharge manifold, and in an optional chemical feed manifold providing connection to a CIP solution supply. The supply manifold most preferably includes a separate connection to a CIP supply to enable CIP cleaning of the raw milk lines and an upstream raw milk holding tank separate from the balance tank and downstream pasteurized milk lines and holding tank. The provision of a chemical feed manifold permits a short wash cycle to be performed in the balance tank, heat exchanger and downstream pasteurized milk valves and pipes without introduction of CIP solution into the raw milk supply and without the necessity of disconnection or tear-down of piping or components. Beneficially, a CIP cleanable vacuum breaker valve is provided between the cooling section of the heat exchanger and the backpressure valve to permit CIP cleaning of the vacuum breaker valve, usually located at an elevated position relative to the remainder of the system, and thus avoid the need for teardown or disassembly of a remote section of the assembly for cleaning. The controller section is electronically connected to each of the valves to permit remote operation of the system, either automatically during continuous operation or through the operator actuating switches to change between pasteurizing, flushing or operating modes.

In especially preferred embodiments, the system includes a booster pump coupled to a frequency drive enabling the booster pump to operate at different speeds. At a lower speed, the booster pump increases the flow of the raw milk through the regeneration portion of the heat exchanger to avoid placing greater suction demand on a stuffer pump supplying the heat exchanger, while at a second, higher speed is used to improve the flow of CIP solution during washing cycles of the heat exchanger section. A homogenizer serving as a timing pump as described above is conventionally provided. Advantageously, a by-pass valve may be provided between the homogenizer and the heat exchanger in order to permit CIP cleaning only on the heater and those portion of the system downstream therefrom handling heated milk.

As a result, the system of the present invention provides substantial benefits in operation and safety. The chance of spillage or splashing of acid or caustic cleaning chemicals is reduced, as well as the possibility of falls or burn injury from contact with hot liquid or piping. The exposure of system components and pipelines, as well as liquid products to debris or airborne contamination is reduced, and downtime due to changeover of piping is reduced. Moreover, the operator is provided with increased flexibility whereby the supply manifold and raw milk supply, the discharge manifold, the balance tank and pumps, or the heat exchanger section, vacuum breaker, flow diversion section and associated pipelines may be isolated for CIP cleaning without interrupting the flow through other sections of raw milk or potable water.

These and other advantages will be readily apparent to those skilled in the art with reference to the drawings and description of the preferred embodiment, it being understood that the invention is not limited by the description but rather by the claims which follow.

DESCRIPTION OF THE PREFERRED EMBODIMENT

Referring now to the drawings, a prior art high temperature short continuous pasteurizing system 10 designed to treat raw milk products (for example, whole milk, 2% butterfat milk, skim milk, half and half, cream or chocolate milk) includes a raw milk supply 12 from a bulk holding tank or truck tank, a balance tank 14, a homogenizer 16 which serves as a timing pump, a heat exchanger 18, a holding tube 20. Raw milk, as used herein, means milk which has not been treated to the requisite standard to be considered pasteurized and aseptic. Thus, milk entering the system is considered "raw" until it has been heated to a sufficient temperature and maintained above that temperature during passage through the holding tube 20 so that a temperature sensor 22, known to those skilled in the art as an STLR, measures milk flowing therepast at or above the predetermined temperature, typically 162° F. (about 74° C.). The heat exchanger 18 includes a heater section 24 for elevating the entering raw milk to a sufficient temperature, such as about 170° F., to maintain it above the requisite temperature for the requisite time—at least 16 seconds, a regeneration section 26 which permits the raw milk to scavenge excess heat from the treated milk and thereby provide preheating for the raw milk and pre-cooling to the treated milk, and a cooling section 28 which receives pasteurized milk from the regeneration section 26 for reducing the temperature of the treated milk to a holding temperature, preferably about 35° F. (about 1 to 2° C.) after it leaves the regeneration section.

The balance tank 14 is provided with a level sensor 30 which detects the level of milk within the tank. Milk or other liquid admitted into the balance tank 14 is preferably maintained below a fill plane F but excess liquid may overflow onto the floor. This is especially possible when swing arm 32 is uncoupled from the pipe 34 leading to the raw milk supply 12 and instead coupled manually to a connection leading to a CIP liquid supply 36 pipe. In the prior art, such coupling was typically accomplished by stainless steel threaded couplings. A pipe providing a potable water supply 38 is typically separate and swings into position over the balance tank 14 so that potable water flows by gravity into the balance tank 14 provided its lid is opened.

The homogenizer 16 maintains flow of milk through the system 10 at the proper rate. That is to say, the homogenizer 16 functions as a timing pump so that heated milk leaving the heater section 24 flows through the heater section 24 and the holding tube 20 at the desired rate of flow to achieve the requisite 16 second period for the minimum temperature. A typical homogenizer 16 useful in this regard is Model # Alex 300 from Tetra Pak of Pleasant Prarie, Wis. A typical heat exchanger 14 useful in this invention is Model # CLIP-8-RM from Tetra Pak of Pleasant Prarie, Wis.

A number of valves are provided for directing the flow of the milk through the system 10. They include a raw milk inlet valve 40; start-up/recirculation valve 42; a flow diversion device 44 including divert valve 46 for returning milk to the balance tank 14 through pipe 48 for retreatment or allowing the milk to flow downstream and a leak detect valve 50 which is normally open but closes to divert milk back to the balance tank 14 through sight glass 52 and pipe 54 in sublegal conditions (temperature or residence time in the holding tube) as a means of ensuring flow diversion in the event that a seal in flow diversion valve 46 leaks; a vacuum breaker valve 56 located along an elevated stretch of pipeline downstream from the cooling section 28 to admit air into the pipeline and thereby avoid siphoning when upstream pressure decreases; a backpressure valve 58 for ensuring the pressure of the pasteurized milk in the pipe on the entering side of the valve 58 is higher than the pressure of the raw milk in the regeneration section 26 of the heat exchanger 18 to maintain positive pressure and thereby avoid contamination in the event of leakage between the raw milk and pasteurized milk in the regeneration section, a forward flow valve 60 for blocking the flow of liquid to a pasteurized milk delivery line 62 which leads to a pasteurized milk holding tank. During recycling or cleaning; a drain valve 64 leading to drain 66 for discharging unusable liquid or CIP solution; and recycle valve 68 which is fluidically connected to the balance tank 14 by pipe 70.

Booster pump 72 is positioned along pipe 74 leading toward regeneration section 26 from start-up recirculation valve 42 in order to increase pressure and improve flow in the milk flowing to the regeneration section of the heat exchanger 18 to scavenge heat from the treated pasteurized milk. A secondary CIP pump 76 is connected in series with booster pump 72 when CIP solution is passed through the system and operates at about 150% of the flow rate of the booster pump. A stuffer pump 78 is used to assist homogenizer 16 by reducing the suction load thereon.

A hot water supply 80 is provided for heating water supplied to the heater section of the heat exchanger 18 and includes a steam supply control valve 82, a hot water heater 84 which receives the steam from the steam supply control valve 82, a hot water pump 86 and a water supply 88. It may be readily appreciated that electric resistance heating, gas or oil fired water heaters may be employed instead of a steam heated water heater as shown. The water heated by the heater 84 is circulated by pump 86 through hot water line 90 where, in heater section 24, the milk supplied by pipe 92 from homogenizer 16 is heated.

Pipes within the system 10 are stainless steel and for ease of identification in the drawing, outfeed pipe 94 connects the heater section 24 with the holding tube 20; pipe 96 connects the holding tube with the temperature sensor 22; pipe 48 connects divert valve 46 with the balance tank 14; pipe 54 connects the leak detect valve 50 with the balance tank 14; pipe 98 connects the leak detect valve 50 with the regeneration section 26 of the heat exchanger 18; pipe 100 connects the cooling section 28 to the vacuum breaker valve 56; pipe 102 connects the backpressure valve 58 with the forward flow valve 60; and pipe 104 leads from a T connection 106 to a second T connection 108 leading to drain valve 64 and recycle valve 68.

System 10 further includes a controller section 107 including a number of sensors for monitoring the conditions of operation in the system. While the use of such sensors is well understood by those in the art, those sensors include a pressure gauge 109 for monitoring the pressure of the raw milk leaving the booster pump, a temperature gauge 110 for measuring the temperature of the milk leaving the holding tube 20, a pressure gauge 112 for measuring the pressure in pipe 100 leading from the cooling section 28, a temperature gauge 114 for measuring the temperature of the milk leaving the cooling section 28, a temperature gauge 116 also for measuring the temperature in the pipe 100, and a temperature gauge 118 for measuring the temperature of the hot water in hot water line 90 and leaving the hot water heater 84 in the heating system 80.

The controller section 107 of the system 10 of the prior art also includes a number of controls as are conventional in the art. These include a high temperature short time heat exchanger controller 120 electrically connected to STLR sensor 22 by control conduit 122 and to temperature gauge 116 for receiving signals corresponding to temperature therefrom, a differential pressure switch 124 electrically connected to pressure gauge 108 and pressure gauge 112 for receiving signals corresponding to pressure of the milk in the pipes 74 and 100, respectively, a flow diversion panel 126 both electrically and pneumatically connected to valves 46 and 50 for sensing and diverting the flow of milk when illegal conditions exist, a hot water controller 128 electrically connected to temperature gauge 118 and steam supply control valve 82 for regulating the amount of steam energy to be supplied to the hot water heater 84 according to the temperature of the milk in pipe 96, a hot temperature digital reference thermometer 130 electrically connected to temperature gauge 110 for receiving signals corresponding to the temperature of the milk in the pipe 96, and a cold temperature digital reference thermometer 132 electrically connected to temperature gauge 114 for receiving signals corresponding to the temperature of the milk in the pipe 100. The HTST controller, the differential switch, the flow diversion panel, the hot water controller, and the hot and cold digital reference thermometers are interconnected as shown to exchange operating signals, and the valves may be remotely controlled by the operator through switches at an operator station as well as automatically as is well understood by those skilled in the art.

In the operation of the prior art system, milk is delivered from supply 12 to the balance tank 14. During initial start up until the raw milk reaches the required temperature, milk is delivered from balance tank 14 to pipe 134 and through stuffer pump 78 and homogenizer 16 to heater section 24. Hot water from heater section 80 then heats the milk which is delivered to holding tube 20. Until the temperature reaches the prescribed minimum temperature sensed at STLR 22, the flow diversion valve 46 diverts the raw milk back through pipe 48 to balance tank 14. Once legal operating conditions have been achieved, divert valve 46 delivers the milk to valve 50 and then to pipe 98 where it passes through regeneration section 26 and cooling section 28. In regeneration section 26 which operates as a counterflow heat exchanger, the pasteurized milk gives off heat to raw milk circulating through pipe 74 delivered by booster pump 72. The pasteurized milk then continues to cooler section 28 and to pipe 100 where if conditions remain legal and acceptable to the operator, the pasteurized milk passes through forward flow valve 60 via swing bend 61 to pipe 62 for delivery to a pasteurized milk holding tank or a pipeline leading to a tank car, or for further processing into a dairy product such as cheese, butter, etc.

During changeover of one milk product to another, such as skim milk to a chocolate flavored milk, potable water is introduced to flush the system. This requires disconnection of the swing bend 32, placement of the potable water supply 38 over the balance tank 14, and flushing of the system with water which is diverted from pipe 102 to pipe 104 leading to drain valve 64. If the system is to be changed from pasteurizing skim milk to 2% butterfat milk, then the milk can be recycled through valve 68 until proper butterfat levels in the milk in the system are achieved. From time to time during a days operations, it is necessary to perform a short wash cycle which necessitates circulating CIP solution through the system. This necessitates substitution of secondary CIP pump for the booster pump 72 and disconnection of the swing bend 32 from the raw milk pipe 34 and connection of swing bend 61 to CIP T-connection 105. After the cleaning cycle is complete, which does not include the vacuum breaker valve 56, swing bend 32 and swing bend 61 leading to forward flow valve 60 are reconnected to pipes 34 and 62 respectively.

In describing the improved high temperature short time pasteurization system 200 of the present invention, like reference characters used in describing the prior art system 10 of FIGS. 1*a* and 1*b* where the same components are used. Thus, for example, the hot water supply 80 is shown only by a single reference character and box, it being understood that the components are as shown in FIGS. 1*a* and 1*b*. As used herein, the term "mixproof valve" shall mean a single valve body having therein two or more valve seats each biased to a normally closed position, with a chamber between the two valve seats that has a vent tube providing a drain passage to permit liquid leaking past one of the seals to vent outside the system to the atmosphere.

Figure 2A:
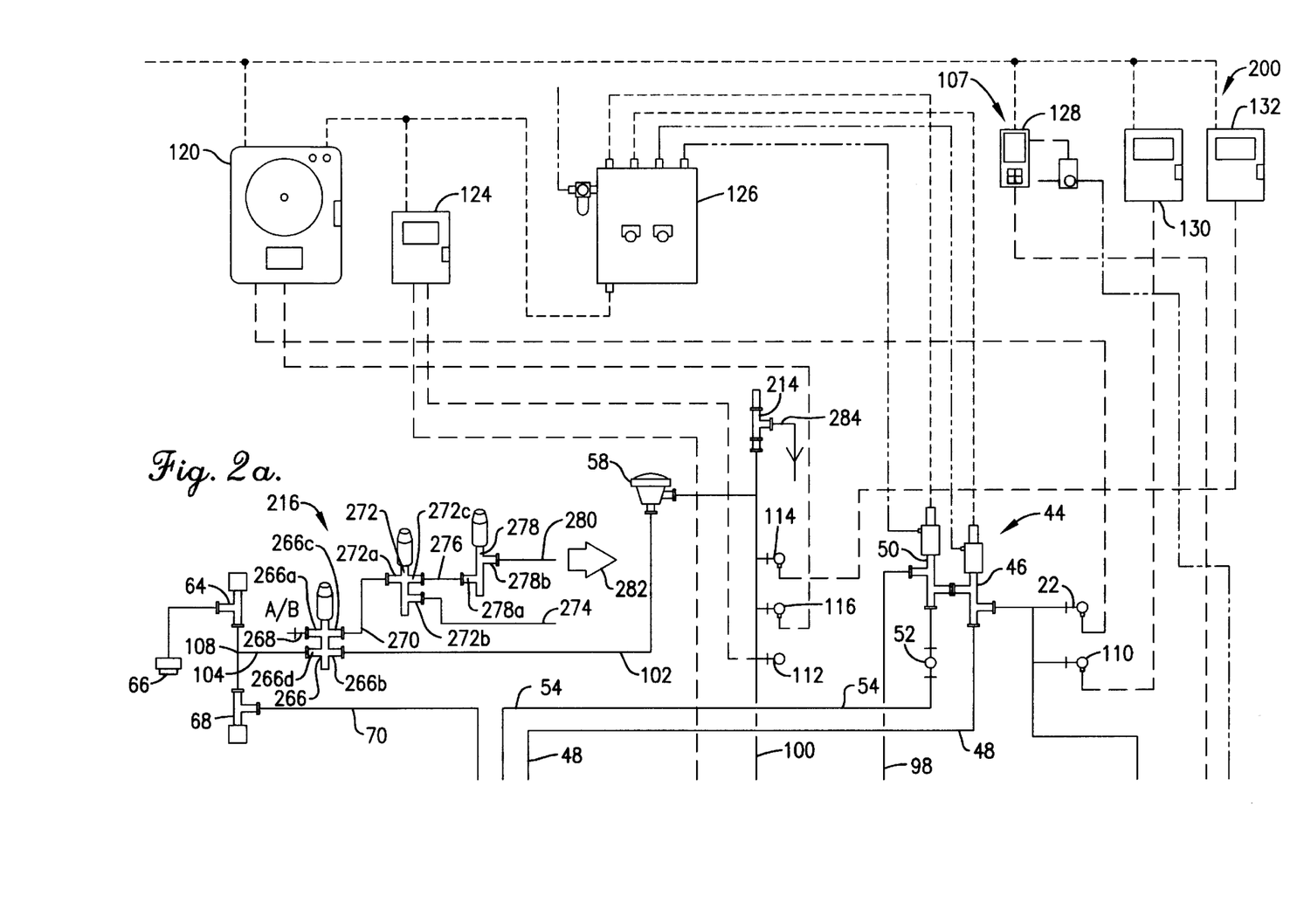
FIGS. 2a and 2b are schematic drawings of a high temperature short time continuous pasteurizing system for milk products in accordance with the present invention, FIG. 2a being a portion of the system of the present invention and FIG. 2b showing the remaining portion, it being understood that FIGS. 2a and 2b are to be read together as a single system.
Figure 2B:
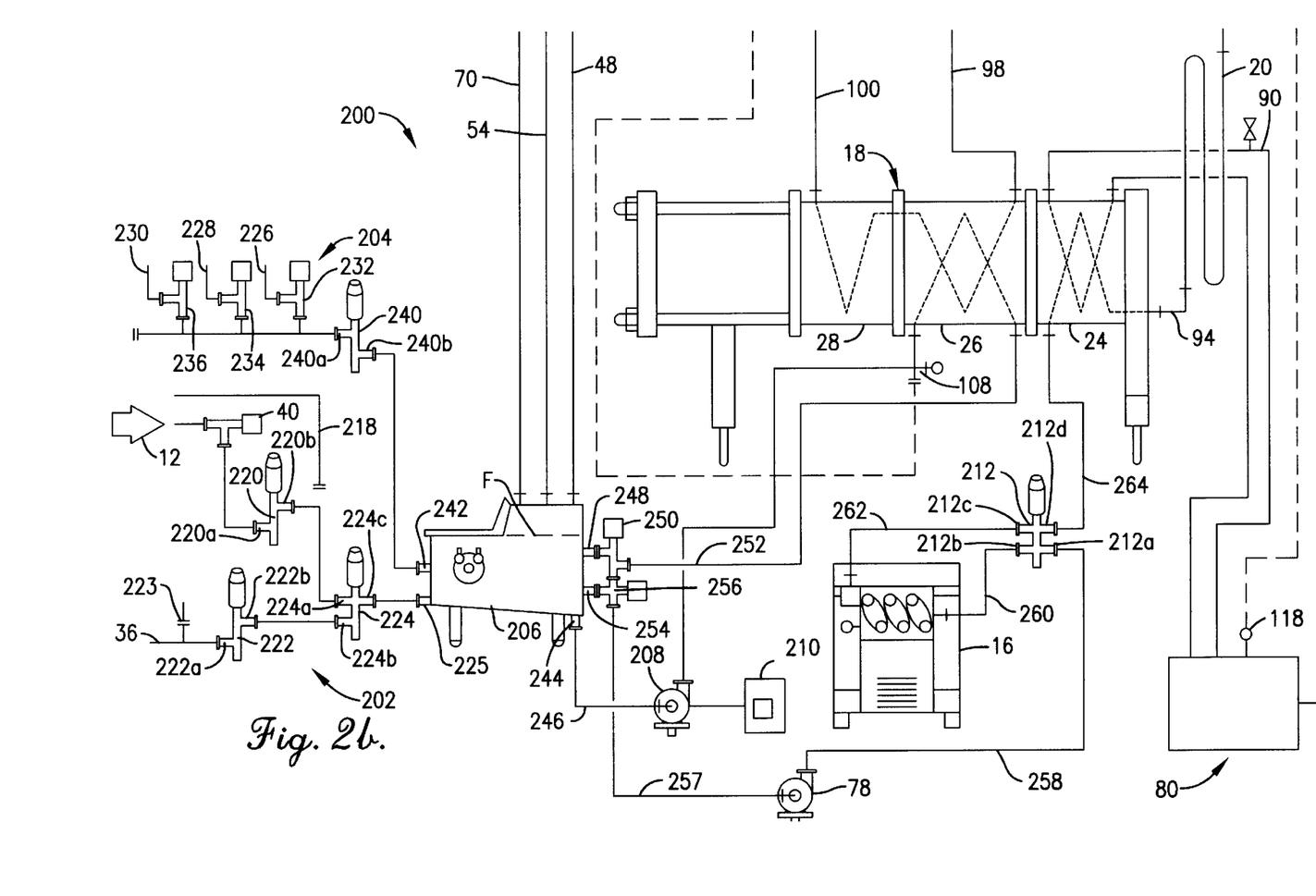

The preferred embodiment of the system 200 of the present invention shown in FIGS. 2*a* and 2*b* includes a supply manifold 202, a chemical feed manifold 204, a balance tank 206, a combination booster pump/CIP pump 208 coupled to an A/C frequency drive 210, a timing device bypass valve 212, a vacuum breaker valve 214, and a discharge manifold 216 in addition to the like numbered components described above with reference to the prior art. The system further includes an optional connection to a CIPR line 218, meaning a CIP supply for the raw milk, illustrated as a manual swing arm connection but which could be permanently connected and operated by a mixproof valve, to the supply manifold 202 to provide CIP cleaning to the raw milk supply 12.

In greater detail, the supply manifold 202 includes existing raw milk supply valve 40 fluidically connected to raw milk supply 12 and additionally a raw milk routing valve 220, a potable water double block valve 222, and a potable water and raw milk block valve 224 fluidically connected to both raw milk routing valve 220 and potable water double block valve 222 as well as inlet 225 of balance tank 206. Raw milk routing valve 220 has an inlet 220*a* fluidically coupled by a conduit to raw milk inlet valve 40 and an outlet 220*b* leading via a conduit to a first inlet 224*a* of raw milk double block valve 224. Potable water double block valve 222 is provided to ensure that no raw milk passes upstream therepast into the potable water supply 36 and includes an inlet 222a for receiving potable water under pressure from potable water supply 36 and an outlet 222b for flowing potable water to a second inlet 224b of raw milk double block valve 224. Raw milk routing valve 220 and potable water routing valve 222 are provided as mixproof valves such as are provided by Alfa Laval Flow Inc. of Pleasant Prairie, Wis. as Model # SMP-SC3-3A-11-90. Raw milk double block valve 224 includes both upper and lower seals between each inlet 224a and 224b to the outlet 224c and is available as Model # SMP-SC3-3A-12-90 from Alfa Laval Flow Inc. of Pleasant Prairie, Wis. The potable water double block valve 222 receives water from potable water supply 36 and a pressure transducer 223 is located upstream between the potable water supply 36 and the potable water double block valve 222 to ensure that a preselected minimum pressure is provided and maintained in the water supply 36 to prevent backflow of liquid into the potable water supply 36. If such minimum pressure is not maintained, double block valve 222 is not allowed to open; and further will close immediately if already open.

Chemical feed manifold 204 provides a source for introduction of CIP solution into the system 200 and preferably a plurality of different cleaning solutions. In the preferred embodiment, separate inlet lines 226, 228 and 230 provide respectively alkaline cleaner, acid cleaner and sanitizing solution. Examples of commercially available alkaline cleaners include Chlor-Mate # 1821, of acid cleaners Hi-Temp 1000 # 1810, and of sanitizers RPM # 1882, all suitable for CIP application and available from West Agro, Inc. of Kansas City, Mo. Each inlet line 226, 228 and 230 is regulated by a separate and respective seat valve of conventional construction. Thus, seat valve 232 controls the delivery of alkaline cleaner, seat valve 234 controls the delivery of acid cleaner, and seat valve 236 controls the delivery of sanitizer. Each of the seat valves 232, 234 and 236 are independently controllable by the operator from a remote control panel and are fluidically connected to supply line 238 leading to mixproof chemical feed valve 240, of which Model # SMP-SC3-3A-11-80 from Alfa Laval Flow is one type suitable for use. The chemical feed valve 240 includes inlet 240a which receives the desired CIP solution from one of the seat valves 232, 234 and 236 and an outlet 240b from which the CIP solution passes via a conduit to the balance tank chemical feed inlet 242. Thus, the chemical feed manifold 204 is connected to the chemical feed inlet 242 of balance tank 206, separate from inlet 225, and the use of the mixproof valve prevents undesired flow of raw milk upstream into the chemical feed manifold or CIP chemicals downstream into the raw milk to eliminate contamination.

Balance tank 206 further includes three separate outlets as well as inlets 225 and 242, all located below fill plane F. Flood plane F provides a constant head for supplying milk downstream. A first outlet 244 fluidically connects a pipe 246 which leads directly to booster/CIP pump 208. A second outlet 248 connects to a regeneration return seat valve 250 receiving milk from pipe 252 returning from the regeneration section 26, and a third outlet 254 connects to a delivery seat valve 256 from which milk flows through pipe 257 to stuffer pump 78. In addition, regeneration return seat valve 250 delivers milk to delivery seat valve 256 when the system 200 has reached operating temperature and is in a normal operating mode.

Booster/CIP pump 208 is driven by alternating current frequency drive 210 unit for two different modes of operation. In a first operating mode, the booster pump is typically driven at about 1750 rpm for boosting the pressure of the raw milk delivered to the regeneration section 26. However, the booster/CIP pump is also capable of functioning to deliver CIP cleaning solution during short wash cycles, whereby the CIP solution may be more rapidly be delivered without the foaming problems inherent in inducing flows in milk. Thus, in a CIP delivery mode, the A/C frequency drive 210 operates the booster/CIP pump 208 at 150% of normal milk delivery rpm. A useful booster/CIP pump 208 is provided as Model # GHH-40 by Alfa Laval Flow Inc. and a useful A/C frequency drive is available as Model # 1336 Plus by Allen-Bradley of Milwaukee, Wis.

Short wash cleaning is further facilitated by the provision of a double seat mixproof timing device by-pass valve 212 which meets the criteria of the PMO. In a normal operating mode, milk flows from the stuffer pump 78 through pipe 258 and through a first inlet 212a at the normally lower side of the by-pass valve 212, then through first outlet 212b to pipe 260 to the homogenizer 16, and then from the homogenizer through pipe 262 into the second inlet 212c and through the upper side of the by pass valve 212 from second outlet 212d to infeed pipe 264 leading to the heater section 24. The mixproof timing device by-pass valve 212 provides double block and bleed protection between the upper side and the lower side so that legal flow rate cannot be exceeded, valve seat position verification is provided whereby the flow diversion device 44 diverts the flow of milk back to the balance tank 206 if valve seat movement is detected with a time delay of at least sixteen seconds before forward flow is resumed. The by-pass valve 212 can be shifted to a CIP circulation mode which routes the CIP solution from pipe 258 to pipe 264, thereby circumventing the homogenizer 16 which operates continuously during CIP cleaning as a non-flow promoting device. The by-pass valve 212 may be pulsed open and closed during CIP to provide proper cleaning of the by-pass valve 212. One by-pass valve suitable for use in the present invention is Model # SMP-PMO from Alfa Laval Flow of Pleasant Prairie, Wis.

The discharge manifold 216 includes a double seat mixproof forward flow valve 266 which meets the criteria of the PMO. One example of a valve useful as forward flow valve 266 is Model # SMP-SC2-PMO by Alfa Laval Flow Inc. of Pleasant Prairie, Wis. Forward flow valve 266 includes an air inlet 266a having an air blow connection 268 which receives filtered, culinary air for purging liquid from the system. Pipe 102 normally feeds pasteurized milk into the liquid inlet 266b of valve 266 and in normal operation delivers the pasteurized milk through first outlet 266c to pipe 270. Alternatively mixproof forward flow valve 266 can be actuated so that, milk, flushing water or, e.g. CIP solution received in forward flow valve 266 can be diverted via second outlet 266d to pipe 104 for drainage through drain valve 64 or to pressure relief/recycle valve 68 to return the liquid to the balance tank 206.

Pipe 270 leads to first inlet 272a of PMO mixproof ClPS/pasteurized milk valve 272. Model # SMP-PMO from Alfa Laval Flow Inc. of Pleasant Prairie, Wis. is one valve which can be used as CIPS/pasteurized milk valve 272. Also leading to valve 272 is pipe 274 which conveys CIP solution for sanitizing the pipes and valves through second inlet 272b. Liquid is routed through outlet 272c to pipe 276 which leads from the ClPS/pasteurized milk valve 272 to the inlet 278a of a pasteurized milk routing valve 278, then via outlet 278b through delivery pipe 280 to a pasteurized milk receiver 282 such as a holding tank, vehicle mounted tank or for further processing into milk products such as cheese.

Vacuum breaker valve 214 is preferably a CIP cleanable vacuum breaker valve such as described in U.S. Pat. No. 5,564,457, the disclosure of which is incorporated herein by reference.

Figure 3:
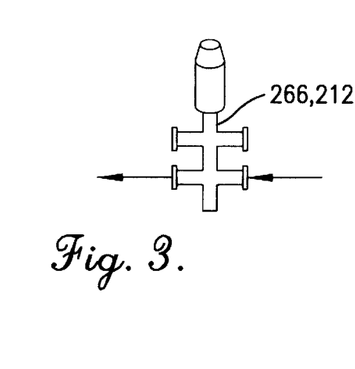
FIG. 3 is a schematic view of a four-connection mixproof valve useful in connection with the present invention as a timing device bypass valve or a forward flow valve, showing the flow of liquid with the valve in the direct flow position from lower right to lower left through the valve.
Figure 4:
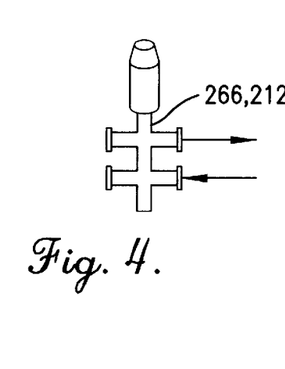
FIG. 4 is a schematic view of the valve of FIG. 3, showing the flow of liquid with the lower and upper valve seats shifted to the by-pass position to divert flow from the lower right conduit to the upper right conduit through the valve.
Figure 5:
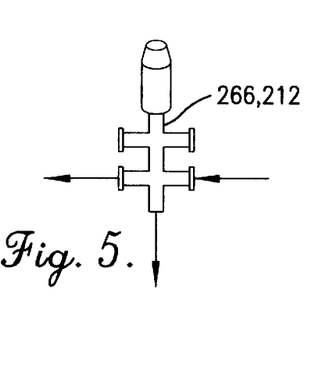
FIG. 5 is a schematic view of the valve of FIG. 3, showing the valve with the lower valve seat shifted and the upper valve seat closed to clean the lower body and conduits of the valve.
Figure 6:
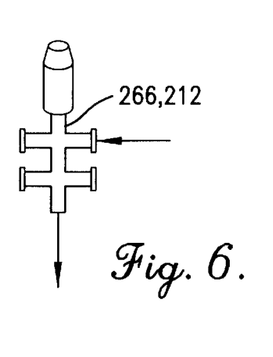
FIG. 6 is a schematic view of the valve of FIG. 3 used as a forward flow valve with the upper valve seat shifted and the lower valve seat closed to clean the upper body and the conduits of the valve.

FIGS. 3 through 6 illustrate possible flows through valves 212 and 266. While valve 212 is not necessarily a PMO mixproof valve, bypass valve 212 as well as forward flow valve 266 provide a direct flow position as illustrated by FIG. 3 and a bypass position as illustrated by FIG. 4. FIG. 5 shows the lower seat lifted to clean that portion of the valve through water flushes or CIP cleaner circulation. FIG. 6 illustrates the flowpath of liquid for CIP cleaning of the upper valve seat. Additionally, the both upper and lower valve seats may be opened or cycled open and closed for cleaning or when pressurized and purified air is introduced into inlet 268 for clearing the valve.

Figure 7:
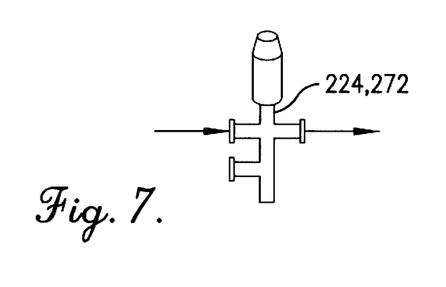
FIG. 7 is a schematic view of a three conduit mixproof valve useful in connection with the present invention as a clean-in-place/pasteurized milk valve or a raw milk and potable water block valve, showing the flow of liquid through the valve with the valve in a direct flow position; from upper left to upper right through the valve.
Figure 8:
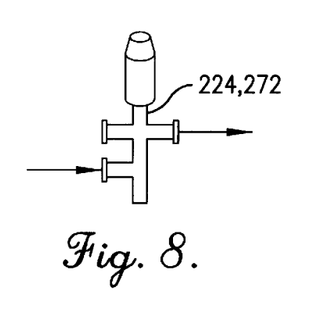
FIG. 8 is a schematic view of the valve of FIG. 7, showing the lower and upper valve seats opened to permit liquid to flow from the lower left conduit to the upper right conduit.
Figure 9:
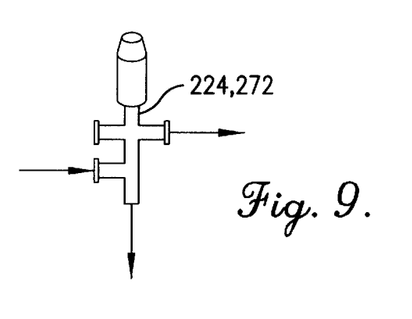
FIG. 9 is a schematic view of the valve of FIG. 7, showing the upper valve seat open or the lower valve seat open to drain to permit cleaning of the valve.

FIGS. 7 through 9 illustrate the flow of liquid through the mixproof valves used as raw milk/water block valve 224 and CIPS/pasteurized milk mixproof valve 272. FIGS. 7 and 8 illustrate alternate normal flowpaths; for example FIG. 7 shows the flowpath of raw milk through valve 224 into the balance tank 206 with the lower seat closed to prevent passage of milk into the water flush line, while FIG. 8 shows the flowpath of potable water for flushing into the balance tank 206 with the upper seat and lower seat lifted. Similarly, with the valve reversed to correspond to valve 272 as shown in FIG. 2a and the directions of the arrows reversed, FIG. 7 illustrates the flow of pasteurized milk from pipe 270 to pipe 276. FIG. 9 illustrates CIP cleaning of valve 224 with the bottom seat raised to clean the valve and discharge CIP solution to drain.

Figure 10:
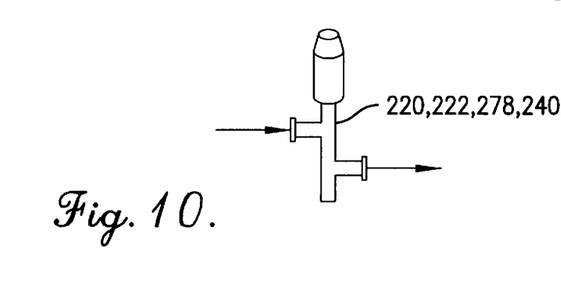
FIG. 10 is a schematic view of a two conduit mixproof valve useful in connection with the present invention as a potable water double block valve, a raw milk routing valve, a chemical feed valve or a pasteurized milk to storage valve showing the valve seats open for direct flow through the valve.
Figure 11:
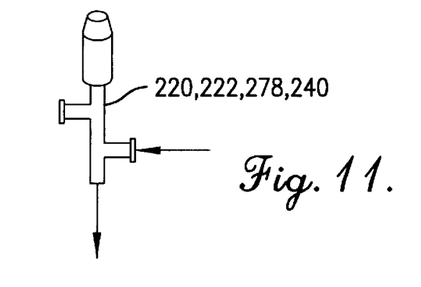
FIG. 11 is a schematic view of the valve of FIG. 10, showing the upper valve seat closed and the lower valve seat open to drain for cleaning the valve.

FIGS. 10 and 11 illustrate the flow of liquid through the mixproof valves including raw milk routing valve 220, potable water double block valve 222, chemical feed valve 240, and pasteurized milk to storage valve 280. FIG. 10 shows the flowpath when the upper and lower valve seats are open during normal liquid flow. For example, FIG. 10 shows the path of raw milk through routing valve 220 from the raw milk supply 12 to the raw milk and potable water block valve 224, or the flow of potable water from the potable water supply 36 through potable water double block valve 222 to the raw milk and potable water block valve 224, or the flow of CIP solution through the chemical feed valve 240 to the inlet 242 of balance tank 206, or the flow of pasteurized milk from CIPS/pasteurized milk valve 272 through the pasteurized milk storage valve 280 to the pasteurized milk receiver 282. FIG. 11 illustrates the alternate flow when the lower seat is lifted in mixproof valves 220, 222 and 240 to flush and/or clean the lower valve body. Pasteurized milk through delivery pipe 280 to storage tank 282 is cleaned by routing CIP solution through the body from the CIPS/pasteurized milk valve 272 and opening and momentarily closing valve 278 to discharge CIP or potable water while permitting liquid to flow therethrough.

It is to be understood that in addition to the seat valves, the mixproof valves 212, 220, 222, 224, 266, 272, and 278, as well as the remaining valves and pumps of the present invention may be remotely controlled by the operator during operation, flushing and cleaning of the system. The vacuum breaker valve 214 does not ordinarily require intervention by the operator except during cleaning so as to keep the internal valve element in an unseated condition to ensure the flow of CIP solution therethrough, thus avoiding the necessity of disconnecting the vacuum breaker valve for cleaning.

During the processing of raw milk to a pasteurized, aseptic condition, raw milk supply 12 delivers raw milk to raw milk supply valve 40 and then to raw milk routing valve 220 and double block valve 224. The raw milk then passes to inlet 225 below the flood plane F of the balance tank 206. During start up, all milk passes through valves 250 and 256 to stuffer 78 and through by-pass valve 212 to homogenizer 16 and back through pipes 262 and 264 to heater section 24. The heated raw milk then flows through holding tube 20, and until STLR sensor 22 detects that the minimum legal temperature has been maintained, the divert valve 46 routes the raw milk to return to the balance tank 206 via the pipe 48. Once legal temperatures are reached at sensor 22, valve 250 cycles after a short time delay and valve 256 closes to outlet 254 opening a sole flow path to pipe 130 and stuffer pump 78. Simultaneously, booster/CIP pump 208 takes raw milk solely from outlet 244 and pipe 246 to permit milk to flow to the regeneration section 26 for preheating the raw milk and partial cooling of the pasteurized milk. When the preheated milk returns, it flows through pipe 252 and delivery seat valve 256 to stuffer 78.

Pasteurized milk flows past the vacuum breaker valve 214 and to the backpressure valve 58 to PMO mixproof forward flow valve 266. Both the lower right and upper right seats are in the open position, which creates a flowpath which permits the pasteurized milk to flow to valve 278 and on to pipe 280. If sublegal conditions exist in the system 200, valve 266 closes to divert the flow of milk from pipe 102 to T connection 108 for movement to either pressure relief recycle valve 68 or to drain valve 64 and to drain 66.

The system 200 may be flushed with potable water without the need to disconnect piping or components or bring a swing arm into position over balance tank 206. Raw milk routing valve 220 is closed and mixproof potable water valve 222 is opened to permit water to flow through block valve 224 and into balance tank 206 through inlet 226 located below the flood plane F. This minimizes splashing and exposure of the balance tank 206 to contaminants. Further, raw mixproof raw milk routing valve 220 prevents the intermixing of potable water with the raw milk supply. Water then flows through the system 200 as described above to flush all the remaining milk therefrom or, in the alternative, after CIP washing, to flush the CIP solution from throughout the system. Vacuum breaker valve 214 can be momentarily opened and closed (pulsed) to permit water to flow therethrough and out through the discharge elbow 284.

It is also possible to perform clean in place cleaning of the raw milk supply lines including the raw milk routing valve 220 and the supply line upstream therefrom. A swing arm connection is made to connect what is normally the outlet of raw milk routing valve 220 to the CIPR line 218, it being understood that instead of the swing arm connection, another mixproof valve of the type shown in FIGS. 10 and 11 could be provided. A cap is then placed on the upper port of raw milk and potable water mixproof valve 224 opposite the balance tank inlet 225. CIP solution may be circulated to valves 220 and 40 and to the raw milk supply, independent of the portion of the system 10 downstream from the raw milk routing valve including the balance tank 206 and the heat exchanger 18. The raw milk routing valve 220 is preferable full stroke pulsed to clean the entire valve during raw milk line CIP cleaning. Similarly, the heat exchanger 18 and other downstream components may be flushed and cleaned independently of the raw milk supply 12 and raw milk lines.

During short wash cycles, designed to clean the heater section 24 of the heat exchanger which has accumulated film or burned-on deposits, portions of the system 200 may be isolated to permit CIP liquid to be delivered without the necessity of disconnecting piping or components. Any of valves 232, 234 or 236 may be opened and PMO mixproof chemical feed valve 240 is opened. CIP solution is fed to the balance tank 206 at substantially zero pressure/vacuum conditions to inhibit flow past the valve seats. The CIP solution is reverse routed through the mixproof feed valve 240 to prevent spillage of the cleaning solution. As a double seat valve, feed valve 240 provides protection against unintended introduction of CIP solution into raw milk. The valve 240 itself may be cleaned when not feeding solution delivered through valves 232, 234 or 236 by actuating the valve 240 to lift the lower seat during heat exchanger cleaning to clean the lower body and vent area of the valve 240 when CIP solution is routed back from inlet 242 of balance tank 206.

CIP solution may be delivered through the raw milk side of regeneration section 26 by booster/CIP pump 228 and by-pass valve 212 may be opened to by-pass cleaning of the homogenizer 16 or closed to circulate CIP liquid therethrough.

What is claimed is:

1. An automatic cleaning, liquid food pasteurizing system comprising:

a source of liquid food product to be heated to a pasteurizing temperature;

a source of potable water;

a heat exchanger including a heater section for heating a food product to a pasteurizing temperature, said heater section including an infeed pipe for receiving the liquid food product to be heated and an outfeed pipe for delivering the heated liquid food product from the heater section;

a balance tank having an operating level fill plane, a first tank inlet positioned below said operating level fill plane, and a tank outlet fluidically connected to said infeed pipe of said heater section; and a first mixproof valve having first and second valve inlets respectively fluidically connected to said source of liquid food product and said source of water simultaneously, and a valve outlet fluidically connected to said first tank inlet, said first mixproof valve being selectively actuatable between a first closed mode to block the flow of liquid therethrough, a second mode for permitting only said liquid food product to flow from said first valve inlet to said valve outlet without said liquid food product and said water mixing in said first mixproof valve, and a third mode for permitting only said water to flow from said second valve inlet to said valve outlet without said liquid food product and said water mixing in said first mixproof valve.

2. An automatic cleaning, liquid food pasteurization system as set forth in claim 1, including first and second supply conduits respectively continuously fluidically connected to said first and second valve inlets providing respective flowpaths for said source of liquid food product and source of water to said first mixproof valve, and a third supply conduit intermediate said valve outlet and said first inlet of said balance tank continuously fluidically connected therebetween during flow of liquid through said system.

3. An automatic cleaning, liquid food pasteurization system as set forth in claim 2, wherein said first mixproof valve is selectively actuatable to a fourth mode for permitting liquid flowing into said first mixproof valve to drain therefrom without flowing between either of said first or second valve inlets or said valve outlet.

4. An automatic cleaning, liquid food pasteurizing system as set forth in claim 2, wherein said first mixproof valve is a double seat mixproof valve for flowing either water or liquid food product entering said first mixproof valve therethrough without intermixing with the other of said water or liquid food product.

5. An automatic cleaning, liquid food pasteurizing system as set forth in claim 2, including a second mixproof valve located intermediate said liquid food source and said and said first mixproof valve.

6. An automatic cleaning, liquid food pasteurizing system as set forth in claim 5, including a third mixproof valve located intermediate said water source and said first mixproof valve.

7. An automatic cleaning, liquid food pasteurizing system as set forth in claim 1, including a source of cleaned in place solution, a second inlet on said balance tank positioned below said operating level fill plane, and a second mixproof valve located intermediate and fluidically connected to said cleaned in place solution for selective actuation between a first closed mode to block the flow of cleaned in place solution therethrough and a second open mode permitting the flow of cleaned in place solution therepast and into said second inlet.

8. An automatic cleaning, liquid food pasteurizing system as set forth in claim 1, including a vacuum breaker valve located downstream from said outfeed pipe and fluidically connected thereto.

9. An automatic cleaning, liquid food pasteurizing system as set forth in claim 7, including a vacuum breaker valve located downstream from said outfeed pipe and fluidically connected thereto, said vacuum breaker valve being selectively actuatable to permit the passage of cleaned in place solution therethrough.

10. An automatic cleaning, liquid food pateurizing system comprising:

a source of liquid food product to be heated to a pasteurizing temperature;

a source of cleaned in place solution;

a source of potable water;

a heat exchanger including a heater section for heating a food product to a pasteurizing temperature, said heater section including an infeed pipe for receiving the liquid food product to be heated and an outfeed pipe for delivering the heated liquid food product from the heater section;

a balance tank having an operating level fill plane, a first tank inlet positioned below said operating level fill plane, a second tank inlet positioned below said fill plane for receiving a first cleaned in place solution therein and a tank outlet fluidically connected to said infeed pipe of said heater section; and a first mixproof valve having a first valve inlet fluidically connected to said source of liquid food product and a second valve inlet fluidically connected to said source of water simultaneously, and a valve outlet fluidically connected to said first tank inlet, said first mixproof valve being actuatable between a first closed mode to block the flow of liquid therethrough, a second mode for permitting only said liquid food product to flow from said first valve inlet and said valve outlet without said liquid food product and said water mixing in said first mixproof valve, and a third mode for permitting only said water to flow from said second valve inlet to said valve outlet without said liquid food product and said water mixing in the first mixproof valve; and a second mixproof valve fluidically connected to and positioned intermediate said first cleaned in place solution source and said second tank inlet, said second mixproof valve being selectively actuatable between a first closed mode to block the flow of liquid therethrough and a second mode for permitting the flow of liquid therethrough.

11. An automatic cleaning liquid food pasteurizing system as set forth in claim 10, including a first delivery valve positioned fluidically intermediate said second mixproof valve and said first cleaned in place solution source for delivering said first cleaned in place solution to said first mixproof valve.

12. An automatic cleaning, liquid food pasteurizing system as set forth in claim 11, including a source of second cleaned in place solution and a second delivery valve positioned fluidically intermediate said second mixproof valve and said second cleaned in place solution source for delivering said second cleaned in place solution to said second mixproof valve.

13. An automatic cleaning, liquid food pasteurizing system as set forth in claim 12, including a source of third cleaned in place solution and a third delivery valve positioned fluidically intermediate said second mixproof valve and said third cleaned in place solution source for delivering said third cleaned in place solution to said second mixproof valve.

14. An automatic cleaning, liquid food pasteurization system as set forth in claim 10, including a discharge manifold having a third mixproof valve, said third mixproof valve including a first connection fluidically connected to said outfeed pipe of said heat exchanger defining a first flowpath, a second connection defining a second flowpath for delivering processed liquid food product to a pasteurized liquid food delivery pipe, and a third connection defining a third flowpath for returning said liquid food product to the balance tank.

15. An automatic cleaning, liquid food pasteurization system as set forth in claim 14, said third mixproof valve including a fourth connection for receiving a source of pressurized air into said third mixproof valve.

16. An automatic cleaning, liquid food pasteurization system as set forth in claim 14, including a fourth mixproof valve in said second flowpath and fluidically connected to said second connection for receiving processed liquid food product therefrom, and including a pipe fluidically connected to said fourth mixproof valve for delivering a second source of cleaned in place solution to said fourth mixproof valve.

17. An automatic cleaning, liquid food pasteurization system as set forth in claim 16, wherein said fourth mixproof valve is selectively actuatable between a first mode for blocking the passage of liquid therethrough, a second mode for permitting passage of said processed liquid food product therethrough, and a third mode for directing the flow of cleaned in place solution from said second source of cleaned in place solution into said second flowpath.

18. An automatic cleaning, liquid food pasteurization system as set forth in claim 17, including a fifth mixproof valve located intermediate said fourth mixproof valve and said pasteurized liquid food delivery pipe.

19. An automatic cleaning, liquid food pasteurizing system as set forth in claim 10, including a vacuum breaker valve fluidically connected to receive pasteurized liquid food product from said outfeed pipe of said heat exchanger and a third mixproof valve positioned downstream from said vacuum breaker valve.

20. A method of cleaning a liquid food pasteurization system having a source of liquid food product to be heated to a pasteurizing temperature, a pasteurized liquid food delivery pipe, a balance tank for receiving the liquid food product to be heated from the liquid food product source, the balance tank having a fill plane during normal operation and a first inlet positioned below the fill plane for receiving said source of liquid food product to be heated from said source of liquid food product, and a heat exchanger having a heater section including an infeed pipe for receiving the liquid food product to be heated from the balance tank and an outfeed pipe for delivering the heated liquid food product from the heater section to the delivery pipe, said method comprising the steps of:

providing a source of potable water and a first mixproof valve, fluidically coupling said first mixproof valve to receive liquid from both said water source and said liquid food product source and to deliver liquid received therein to said balance tank inlet;

actuating said first mixproof valve to permit passage of said liquid food product to be heated therethrough into said balance tank and blocking the flow of water therethrough;

flowing said liquid food product to be heating to said infeed pipe of said heat exchanger;

elevating the temperature of the liquid food product in said heater section to pasteurize said liquid food product;

delivering said pasteurized liquid food product from said outfeed pipe of said heat exchanger to said pasteurized liquid food delivery pipe;

actuating said first mixproof valve to block the flow of liquid food product therethrough and to permit the flow of water through said first mixproof valve into said balance tank and said heat exchanger without flowing said liquid food product past said first mixproof valve to said source of water.

21. A method of cleaning a liquid food pasteurization system as set forth in claim 20, including providing a first source of CIP solution, a second mixproof valve fluidically connected to said first source of CIP solution for receiving CIP solution therefrom, and a second inlet of said balance tank for receiving CIP solution into said balance tank, and further including the steps of fluidically coupling the second mixproof valve to said second inlet of said balance tank, maintaining the second mixproof valve in a condition to block the flow of CIP solution therethrough during pasteurization of said liquid food product, and actuating said first mixproof valve to block the flow of liquid therethrough, and actuating said second mixproof valve to flow CIP solution into said balance tank during cleaning of said system without decoupling said liquid food product source from said first mixproof valve or decoupling said first mixproof valve from said balance tank inlet.

22. A method of cleaning a liquid food pasteurization system as set forth in claim 21, further including the step of flowing said CIP solution into said infeed pipe, through said heater section, and into said outfeed pipe during cleaning of said system.

23. A method of cleaning a liquid food pasteurization system as set forth in claim 21, including providing a second source of CIP solution, and a third mixproof valve fluidically connected to a second source of CIP solution therefrom and to the delivery pipe, and further including the step of actuating said third mixproof valve during cleaning of said system to flow CIP solution from said second source to said delivery pipe.

* * * * *